…

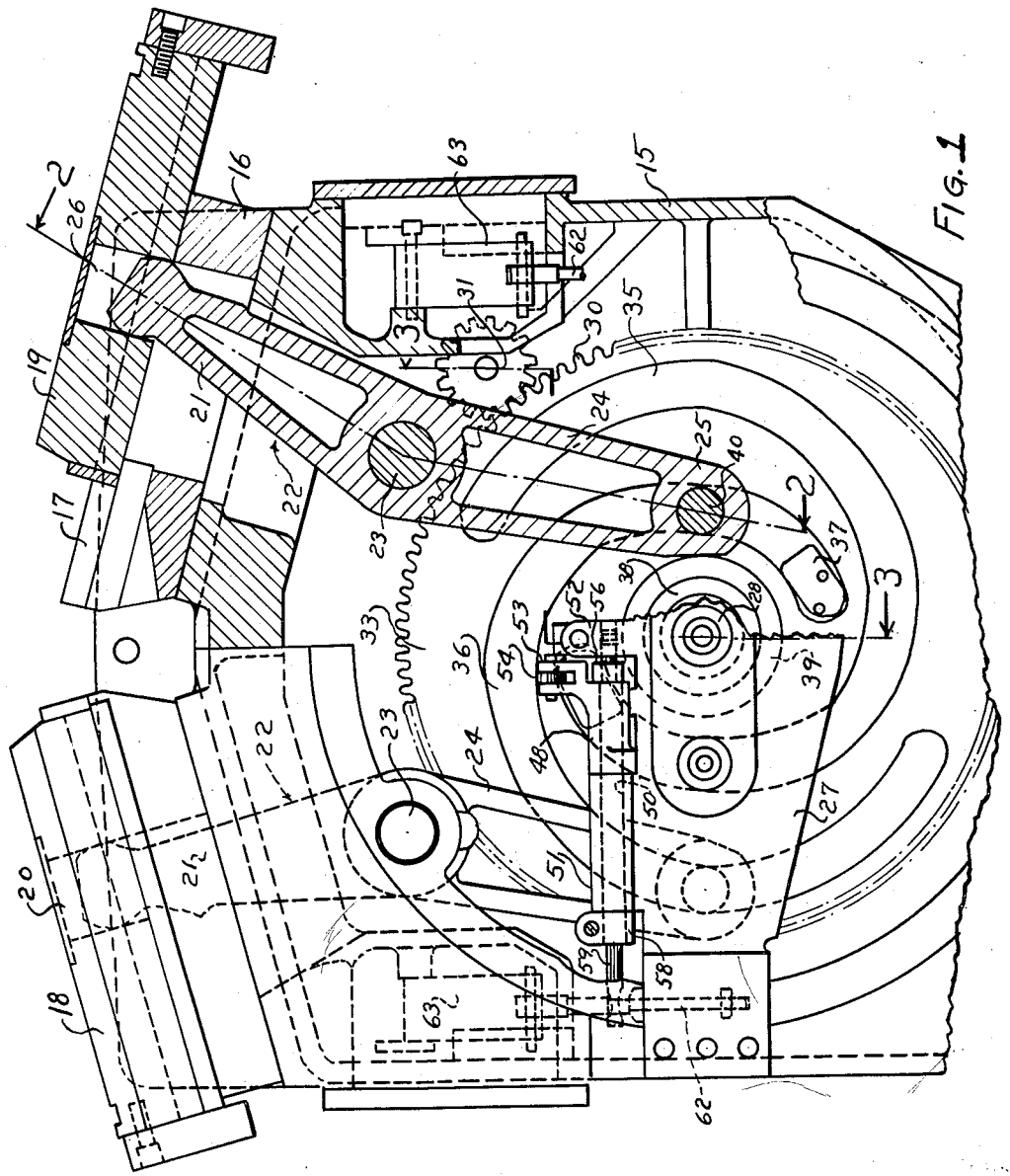

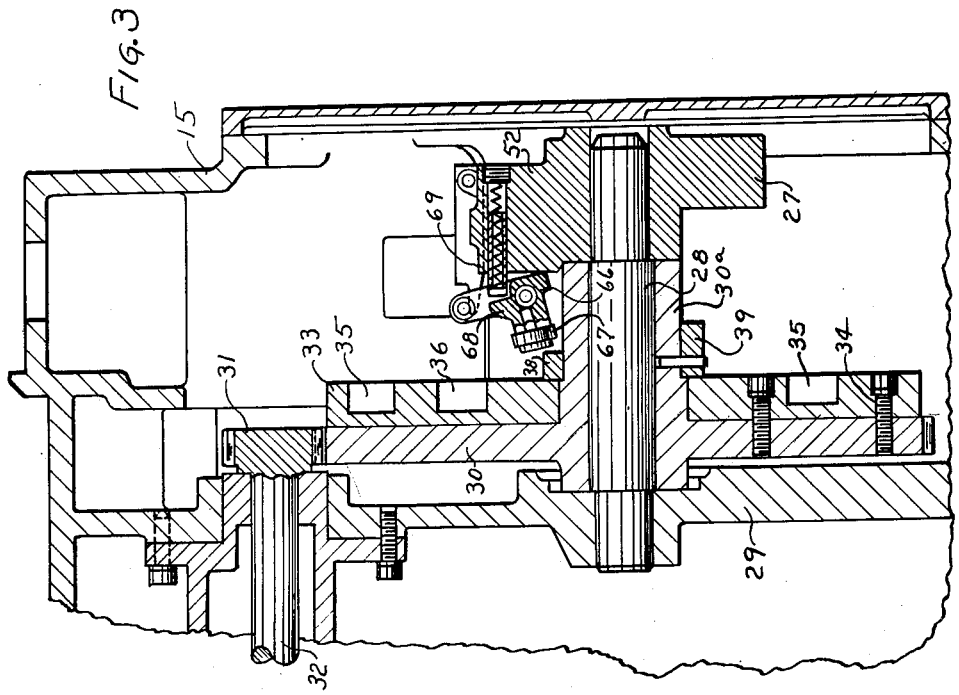
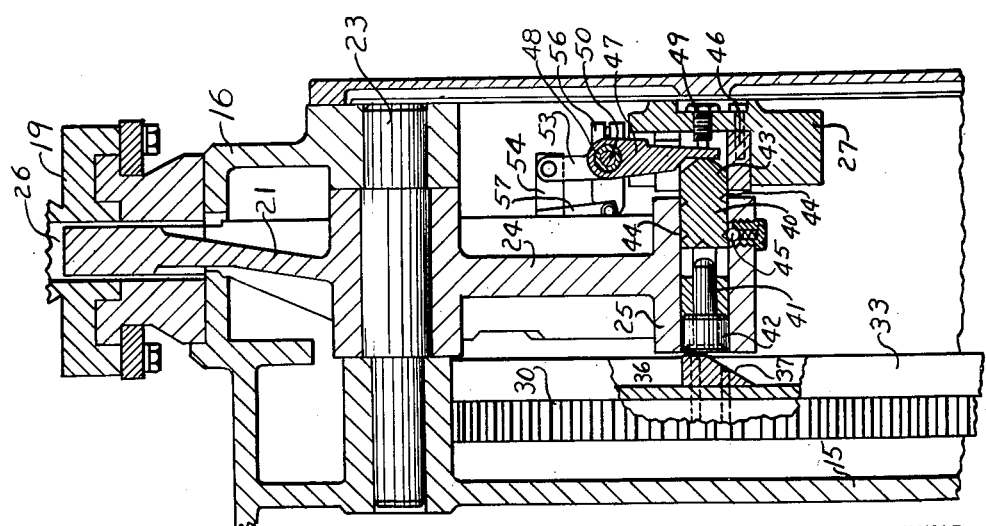

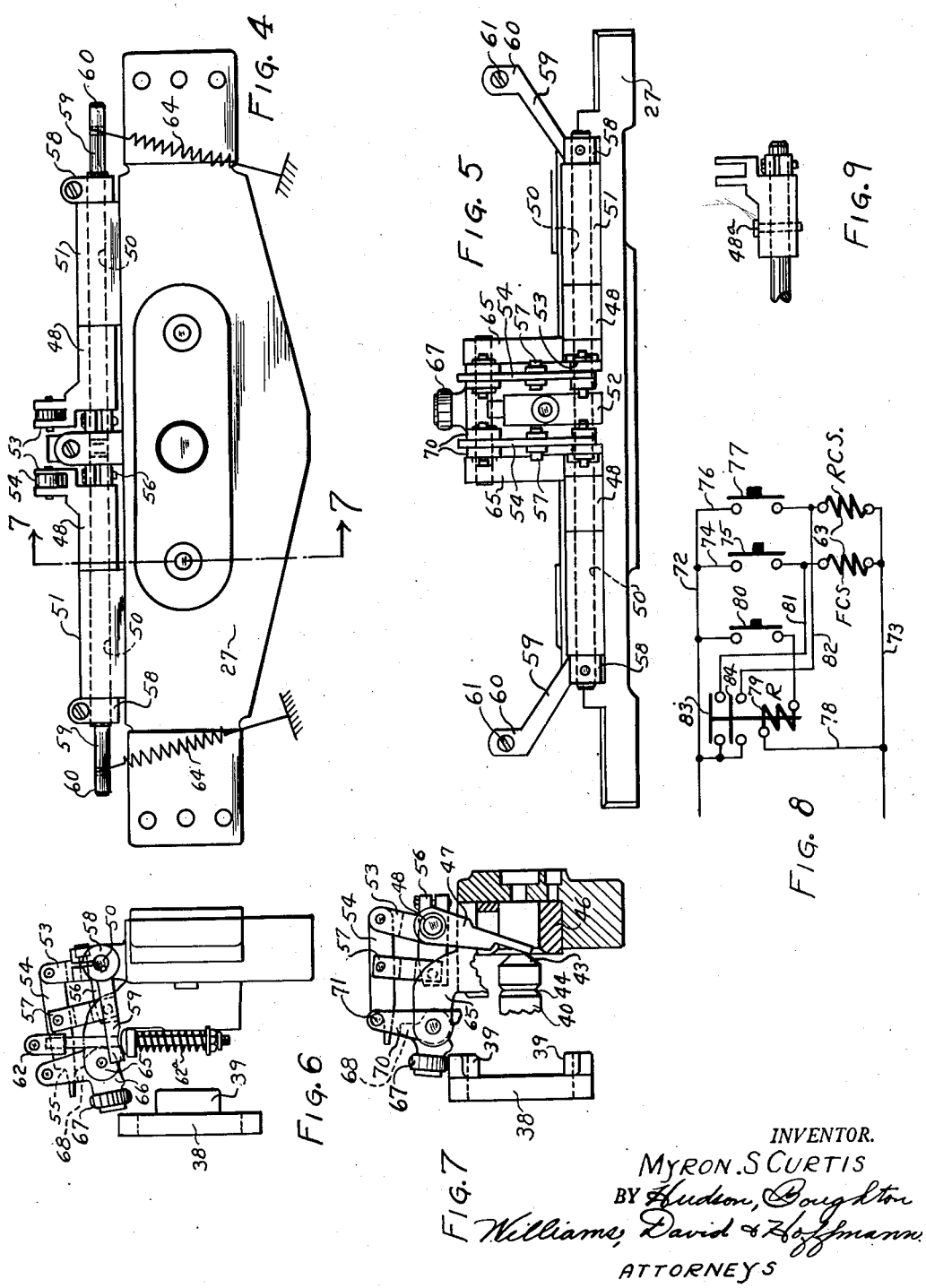

United States Patent Office 2,706,415
Patented Apr. 19, 1955

2,706,415

CROSS SLIDE DRIVE AND CONTROL THEREFOR

Myron S. Curtis, Cleveland, Ohio, assignor to The Warner & Swasey Company, Cleveland, Ohio, a corporation of Ohio Application April 17, 1951, Serial No. 221,421

12 Claims. (Cl. 74—54)

This invention relates to machine tools and more particularly to improved means for actuating the cross slide or slides thereof.

The present invention is an improvement on that disclosed and claimed in United States Patent 2,542,399, issued February 20, 1951, to Myron S. Curtis and Harry Schoepe. In said United States Patent 2,542,399 the movement transmitting members between the cam disks and the cross slides are operatively connected to the cam disks by means of slidable follower pins carried by the movement transmitting members and engageable in the cam grooves of the cam disks. In said patent the sliding follower pins are actuated to cam groove engaging position electrically and more particularly by solenoids. In the structure of said Patent 2,542,399 reliance for the proper operation of the sliding follower pins into cam groove engaging position is placed on the correct energization and operation of the solenoids.

An object of the invention is to provide in a machine tool improved means for actuating the cross slide or slides thereof and which means accomplishes the objects of the structure covered by said Patent 2,542,399, and, in addition, provides for improved and novel actuation of the sliding follower pins to fully engaged position in the cam grooves of the cam disk to interconnect the latter with the movement transmitting members that operate the cross slides.

A further object is to provide improved and novel means for actuating the sliding follower pins of the movement transmitting members positively and mechanically into fully engaged position in the cam grooves of the cam disk.

A further object is to provide the improved and novel means referred to in the last named object and which means is electrically controlled and conditioned but mechanically and positively actuated.

A more general object of the invention is to provide improved and novel means for operatively interconnecting the cross slide or slides of a machine tool with the actuating mechanism therefor in a positive, complete and effective manner, such that the slides can be operated singly or simultaneously and safely and without danger of injury to the parts.

Further and additional objects of and advantages inherent in the invention will become apparent hereinafter during the detailed description of an embodiment of the invention which is to follow.

Referring to the accompanying drawings illustrating said embodiment of the invention, Fig. 1 is a fragmentary partial end elevational view and partial sectional view of the frame of a machine tool having on the bed thereof front and rear cross slides.

Fig. 2 is a sectional view taken substantially on line 2—2 of Fig. 1 looking in the direction of the arrows.

Fig. 3 is a sectional view taken substantially on line 3—3 of Fig. 1 looking in the direction of the arrows.

Fig. 4 is a detached elevational view of a portion of the construction shown in Figs. 1 to 3 inclusive.

Fig. 5 is a top plan view of the portion shown in Fig. 4.

Fig. 6 is a detached end elevational view of certain of the operative parts of the construction shown in the previous views and illustrates the relationship of said parts during one portion of their operative cycle.

Fig. 7 is a view somewhat similar to Fig. 6 except that certain of the parts of Fig. 6 are omitted while other parts are shown which are not in Fig. 6; said Fig. 7 indicating a different relationship of the operative parts than is shown in Fig. 6.

Fig. 8 is a schematic simplified diagram of a manually actuated electrical control circuit which may be used for controlling the energization of the conditioning solenoids, and Fig. 9 is a fragmentary detached elevational view of a slightly modified arrangement over the preceding views.

Referring particularly to Figs. 1 to 3 inclusive, the machine tool frame is indicated at 15 and it will be understood that the portion of the frame shown constitutes the bed upon which the slides are located.

It will be understood that, as disclosed in said Patent 2,542,399, the machine includes a headstock in which is journaled a rotating spindle (not shown) and which spindle is provided at its outer end with work or tool holding means such that the work or tools carried by said means will cooperate with the tools or work mounted on the cross slides and later to be referred to.

The frame 15 includes a support 16 located below the spindle and forwardly thereof and provided with inclined ways 17 for slidably guiding the front holder or cross slide 18 and the rear holder or cross slide 19, respectively, each of which is adapted to carry tools or work.

The front cross slide 18 is provided with a recess 20 in which is received the upper end of the upper arm 21 of the front movement transmitting element or lever 22. The lever 22 is pivoted for rocking movement on a bearing pin or shaft 23 mounted in suitable bearings formed in the frame 15. The lower arm of the element or lever 22 is indicated at 24 and at its lower end is provided with an elongated boss 25 for a purpose later to become apparent.

The rear holder or cross slide 19 is also provided with a recess 26 similar to the recess 20 of the front cross slide and said recess 26 receives the upper end of the upper arm 21 of a second or rear movement transmitting element or lever 22 which is identical except as to being of opposite hand with the movement transmitting member or lever already described with respect to the front cross slide 18. The second or rear movement transmitting member or lever 22 likewise is pivoted for rocking movement on a pin or shaft 23 mounted in suitable bearings in the frame 15 and its lower arm 24 is provided at its lower end with an elongated boss 25 as is the front lever 22. It will be noted that the bearing pins or shafts 23 for both the front and rear levers 22 are located in the same horizontal plane but are spaced apart transversely of the frame and lie on opposite sides of the longitudinal center line of the frame.

A bracket 27 is secured to the frame 15 and extends transversely of the frame adjacent the lower ends of the arms 24 of the levers 22. The bracket 27 midway of its ends provides a bearing for one end of a shaft 28, the opposite end of which is supported in an interior wall 29 of the frame, see Fig. 3.

A gear wheel 30 is rotatably supported on the shaft 28 adjacent the interior wall 29 and is provided with a stepped elongated hub 30a as clearly indicated in Fig. 3. The gear 30 is driven in timed relationship with the turret operating mechanism of the machine by means of a pinion 31 meshing with the gear 30 and mounted on a shaft 32 that is operatively connected with the turret operating mechanism but which operative connection need not be shown as the same may be conventional.

A movable member or cam disk 33 is mounted upon the stepped hub 30a and adjacent to the forward face of the gear 30, being connected to said face of the gear by suitable means such as the screws 34. The cam disk 33 has its outer face provided with a pair of cam surfaces or cam paths 35 and 36 which are here shown as formed by two identically shaped and circumferentially displaced grooves or cam paths extending from points adjacent the central area of the disk to points adjacent the outer periphery thereof, the outer end of each cam surface or path having a portion with a constant radius of curvature for a purpose to be hereinafter described and all as shown and described in said Patent 2,542,399.

The inner end of each of the cam paths or grooves is provided with an inclined element or cam portion 37 which slopes from the depth of the cam groove to the upper face of the cam disk. A cam ring 38 is secured upon the step portion 30a of the hub of the gear 30 adjacent to the outer face of the cam disk 33 and said cam ring is provided with two high portions 39 circumferentially spaced apart 180° and located outwardly of the forward face of the cam ring as clearly indicated in Figs. 1, 3, 6 and 7. The purpose of the cam ring 38 and high portions 39 thereof will become apparent.

The elongated bosses 25 at the lower end of the arms 24 of the levers 22 each mounts a slidable element, follower, pin or rod (designated broadly in the claims as shiftable means) which when moved to operative position extends into a respective cam groove of the cam disk 33 to operatively interconnect the respective lever 22 with the cam disk so that movement will be imparted to the respective cross slide.

The sliding connecting element, follower, pin or rod as indicated in Fig. 2 comprises a cylindrical rod-like member 40 slidable in the bore of the boss 25 and provided at its end adjacent to the cam disk 33 with a central bore into which is fitted the bearing pin 41 of a roller 42 which has a sliding fit in the bore of the boss and also interfits the cam grooves of the cam disk 33 when located therein. The other end of the follower pin 40 is of conical configuration as indicated at 43 so that a rocking actuating member later to be referred to can cooperate with said end to move the follower pin 40 and the roller 42 toward the cam disk 33.

The follower pin 40 is provided with longitudinally spaced annular grooves 44 while the boss 25 of the lever arm mounts a spring point 45 in the form of a ball detent and which engages in one or the other of the grooves 44 to frictionally hold the pin 40 either in its retracted or inactive position or in its projected or active position, at which latter time the roller 42 is in a cam groove of the cam disk 33.

When the follower pin 40 is in its retracted or inactive position as shown in Fig. 2, the conical end 43 thereof extends into a bushing 46 carried by the bracket 27 on the inner side thereof, as indicated in Fig. 2, it being understood that there are two of such bushings spaced transversely of the machine frame and each in a position to receive the conical end 42 of a respective pin 40 when the latter has been moved to its inactive position by the inclined element 37.

An actuating lever arm or member 47 depends from a sleeve 48 and passes through a slot in the bushing 46 and has its lower end in position to engage with the conical end 43 of the follower pin, the movement of the lever arm 47 in a counterclockwise direction as viewed in Fig. 2 being limited by a stop screw 49 carried by the bracket 27.

The sleeve 48 is mounted on a rockable rod 50 and is free to rock independently thereon while said rod is rockably supported in an elongated bearing boss 51 formed on the upper edge of the bracket 27 with the inner end of the rod extending into a bearing opening formed in a centrally located upstanding portion 52 on the bracket 27.

It will be understood that there are two of the rockable rods 50 mounted above the bracket 27 on opposite sides of the upstanding portion 52 with each rod having its inner end journaled in the portion 52 and extending through an elongated bearing boss 51. Also it will be understood that each of the rods 50 has mounted thereon an independently rockable sleeve 48 having the depending actuating lever arm or member 47 for actuating a respective sliding connecting element or pin 40. In other words, the mechanism just above described, as well as that now to be described, is duplicated on each side of the upstanding portion 52, since each of the movement transmitting levers or members 22 mounts in the boss 25 at its lower end a sliding connecting element or pin 40. However, it is only necessary to describe one of the mechanisms it being understood that the other mechanism is identical.

The sleeve 48 at its inner end adjacent the upstanding portion 52 is provided with an upstanding fork 53 and pivotally mounted between the tines of this fork is one end of a long lever or settable member 54, the opposite end of which is cut away to provide a shoulder 55 for a purpose later to be explained.

The rockable rod 50 passes through the split end of a short lever 56 and said lever end is rigidly connected to the rod by being clamped thereto by means of a clamping bolt mounted in the separated portions of the split end of the short lever 56. The short lever 56 is located beneath the upstanding fork 53 and in substantially the same vertical plane as the long lever or settable member 54 and is connected to the latter by a link 57 having one of its ends pivotally connected to the long lever 54 intermediate the ends thereof and its other end pivotally connected to the end of the short lever arm 56. It will thus be seen that rocking movement of the shaft or rod 50 will move the short lever 56 and through the link 57 the long lever or settable member 54.

The sleeve 48 abuts one end of the elongated boss 51 while at the opposite end of said boss the collar 58 of an angular lever 59 is fixed to the shaft 50. The angular lever 59 at its free end has an integral angularly disposed portion 60 provided with an opening 61. A vertically movable rod 62 passes through the opening 61 and is provided with spaced rounded portions adapted to engage concavities in the portion 60 of the lever 59 and surrounding the opening 61, wherefore vertical movement of the rod 62, either upwardly or downwardly as the case may be, will rock the lever 59 and the shaft 50.

The upper end of the rod 62 is connected to the armature of a conditioning solenoid 63, it being understood that there will be two such solenoids, one designated as the front cross slide solenoid and the other as the rear cross slide solenoid. It will thus be seen that when the conditioning solenoid 63 is energized in a manner later to be explained, the rod 62 will move upwardly and rock the lever 59 and the shaft 50 in a clockwise direction as viewed in Fig. 6. When the solenoid 63 is deenergized the rod 62 will be moved downwardly by a coiled spring 62a on the rod and the lever 59 and shaft 50 rocked in a counterclockwise direction by a spring 64 connected to the portion 60 of the lever 59 and to a part of the frame. It will further be understood that the rocking of the shaft 50 upon the energization of the solenoid 63 will not operate to rock the sleeve 48 on the shaft but will move the short lever 56 and through the link 57 move and set the long lever or settable member 54 relative to the fork 53 of the sleeve 48. The reason for this arrangement will be explained in detail hereinafter.

The bracket 27 is provided with spaced parallel arms 65 extending toward the cam disk 33 and located on the opposite sides of the long levers 54. A rocker member 66 is rockably mounted on a shaft supported by the arms 65 adjacent the free ends of the latter. The main portion of the rocker member 66 has an extension projecting toward the cam disk 33 and provided on its end with a roller 67 which is in a position to cooperate with the cam ring 38, the high portion 39 thereof acting on the roller 67 to rock the member 66 in a clockwise direction, that is from the position shown in Fig. 6 to the position shown in Fig. 7.

The rocker member 66 at its central portion is provided with an upstanding lug 68 that is engaged by a spring pressed plunger 69 carried in the upstanding portion 52 of the bracket 27 and tending to maintain the rocking member 66 in the position shown in Fig. 3. The rocking member 66 is provided with two pairs of spaced upstanding arms 70 with the arms of each pair interconnected adjacent their upper ends by a pin 71 extending between the arms. The two pairs of upstanding arms 70 are so located that the long levers 54 extend respectively between the arms 70 of the pairs of arms with the cutaway free shouldered ends 55 of the long levers 54 located below the pins 71, see Fig. 6, and in a position to engage the pins 71 when the long levers 54 are moved from the position shown in Fig. 6 to the position shown in Fig. 7.

Although the energization of the solenoids 63 may be effected automatically by suitable automatic controls including control means and a control circuit such as shown in said Patent 2,542,399, a simplified manually actuated control has been shown in Fig. 8 hereof for the sake of illustration and simplification.

Referring to Fig. 8 it will be seen that the front cross slide solenoid 63 is located between the electrical power supply lines 72 and 73 and is connected thereto by a wire 74 in which is a normally open manually controlled switch 75. The rear cross slide solenoid 63 similarly is located between the lines 72 and 73 and is connected thereto by a wire 76 having a normally open manual switch 77 therein. It will be evident that when either the switch 75 or the switch 77 is manually closed the conditioning solenoid 63 for the front cross slide or for the rear cross slide will be energized.

In case it is desired to energize both solenoids simultaneously the following arrangement may be provided. The lines 72 and 73 are interconnected by wire 78 containing a relay 79 and a normally open manually actuated switch 80. Wires 81 and 82 connect, respectively, the wires 74 and 78 and the solenoids for the front cross slide and the rear cross slide to the line 72 by-passing the switches 75 and 77. The wires 81 and 82 contain the normally open contacts 83 and 84 of the relay 79.

It will be evident that until the switch 80 is closed the relay 79 is not energized and the contacts 83 and 84 remain open. At such time the energization of either one of the solenoids 63 can be selectively effected by manually closing the switch 75 or 77 as desired. However, should it be desired to energize both solenoids simultaneously the switches 75 and 77 are allowed to remain open and the operator closes switch 80, thus energizing relay 79 and closing contacts 83 and 84 connecting the solenoids 63 between the lines 73 and 72 by the wires 81 and 82.

The manner in which the hereinbefore described mechanism functions will now be described so as to coordinate and make clear the utilitarian advantages inherent in the construction.

Assuming that the machine is operating and both cross slides are in their most retracted or withdrawn idle position at which time the sliding follower pins 40 will be in their retracted position as indicated in Fig. 2 and the rollers 42 carried thereby will be disengaged from the cam grooves of the cam disk 33. Also at this time the solenoids 63 will be deenergized and the parts will have the relative position of Fig. 6. Assuming it is desired to effect working movement of the rear cross slide 19 at the proper time in the work cycle, the solenoid 63 for the rear cross slide is energized by the operator manually closing the switch 77. This energization of the conditioning solenoid 63 causes upward movement of the rod 62, thus rocking the angular lever 59 and the shaft 50 in a clockwise direction as viewed in Fig. 6. Such rocking of the shaft 50 moves the short lever 56 secured thereto and said short lever 56 operates through the link 57 to swing the long lever 54 on its pivot in a clockwise direction from the position shown in Fig. 6 to the position shown in Fig. 7, at which time the shoulder 55 of the long lever 54 is aligned with and is in engagement with the pin 71 extending between the pair of arms 70. The swinging movement imparted to the long lever 54, as just described, does not impart rocking movement to the sleeve 48 or to the depending actuating lever arm 47, since said sleeve is freely mounted on the shaft 50 and the lever arm 47 engages the sliding follower pin 40 which is held in retracted position by the spring point 45. However, the energization of the conditioning solenoid 63 for the rear cross slide which has effected the movement of the parts from the position shown in Fig. 6 to the position shown in Fig. 7 has conditioned the parts to be mechanically and positively actuated by the cam ring 38.

As the machine operates and the shaft 32 and pinion 31 rotate at the proper time, the cam disk 33 and the cam ring 38 rotate with the gear 30 and then a high point 39 of the cam ring 38 acts on the roller 67 to rock the rockable member 66 from the position to which said member 66 is shown in Fig. 6 to the position in which it is shown in Fig. 7. Inasmuch as the shoulder 55 of the long lever 54 has already been moved into contact with the pin 71, it is evident that the rocking of the member 66 imparts movement to the long lever 54 and such movement acting through the fork 53 rocks the sleeve 48 and the depending actuating lever arm 47 relative to the shaft 50, with said depending lever arm 47 acting on the sliding follower pin 40 to positively and mechanically move said pin in the elongated boss 25 to fully position the roller 42 in the cam groove of the cam disk 33 to effect a driving connection between the cam disk and the movement transmitting member or lever 22 for imparting movement to the rear cross slide 19.

It will be noted that the energization of the solenoid 63 does not effect the insertion of the roller 42 in the groove of the cam disk 33 but merely conditions the parts preparatory to the cam ring 38 mechanically and positively actuating the parts to assure a complete and positive full insertion into the cam groove of the cam disk 33. In other words, the power of the solenoid is not relied upon to effect the insertion of the roller 42 into the cam groove when operatively connecting the lever 22 to the cam disk 33. This is an important consideration since due to current variation and other features the solenoid might at some time fail to develop sufficient power to completely engage the roller 42 in the cam groove of the cam disk 33 and to completely disengage the sliding follower pin 40 with respect to the bushing 46 carried by the bracket 27. It will be understood that should the sliding follower pin 40 not be completely disengaged from the bushing 46 while the roller 42 be partially engaged in the groove of the rotating cam disk 33 that then damage and injury to the machine would occur but this danger is obviated in the present construction.

The present arrangement is such that the full insertion of the roller 42 into the cam groove of the cam disk 33 and the complete disengagement of the follower pin 40 from the bushing 46 is assured by reason of the positive mechanical actuation of the parts by the cam ring 38.

It will be understood that as the cam disk 33 rotates first in one direction and then in a reverse direction after the roller 42 has been engaged in the cam groove of the cam disk 33 the rear cross slide is moved inwardly or toward the spindle and then is moved outwardly to its retracted position and when it has reached its most outward or retracted position the inclined element 37 will cam the roller 42 and the follower pin 40 out of engagement in the cam groove and into the position shown in Fig. 2, at which time the follower pin 40 extends into the bushing 46 carried by the bracket 27 and the rear cross slide is disconnected operatively from the cam disk 33.

It will also be understood that the operator has opened the switch 77 as soon as the operative connection between the cam disk 33 and the lever 22 for the rear cross slide has been effected, wherefore when the follower pin 40 has been moved by the inclined element 37 to the position shown in Fig. 2 the depending actuating lever arm 47, sleeve 48 and long lever 54 and the parts associated therewith will be rocked or moved from the position shown in Fig. 7 to the position shown in Fig. 6.

Also it will be understood that as soon as the roller 67 of the rocking member 66 passes off of the high point 39 of the cam ring 38 the spring plunger 69 will act on the rocking member 66 to move the same from the position shown in Fig. 7 to the position which it has in Figs. 3 and 6.

It will be understood that the same mode of operation occurs with respect to the front cross slide when the operator closes switch 75. Also when it is desired to operate both cross slides simultaneously the operator would close switch 80, effecting simultaneous energization of both conditioning solenoids 63, wherefore the mechanisms for effecting the operative connections between the cam disk 33 and both levers 22 would function simultaneously in the same manner as described with respect to the mechanism for operatively connecting the rear cross slide lever 22 with the cam disk 33 and both follower pins 40 will be extended into their respective cam grooves.

It may be advantageous to have the follower pins 40 moved to cam groove engaging position by the combined action of the solenoids 63 and the rotating cam ring 38. In such an arrangement the rotating cam ring 38 would act on the mechanical parts of the actuating mechanism to assure complete movement of the follower pins 40 to fully position the rollers 42 in the cam grooves. All that would be necessary to modify the construction previously described so that it would accomplish the arrangement just referred to is to have the sleeves 48 pinned or otherwise fixed to the rockable rods 50 by set screws or pins 48a and such an arrangement is shown in Fig. 9, it being understood that while only one sleeve 48 is illustrated in Fig. 9 both sleeves 48 would have the fixed connection to their respective rods 50. In the modified arrangement referred to the complete engagement of the rollers 42 in the cam grooves would be assured by the operation of the mechanically operated parts even though the power exerted by the solenoids might vary due to current fluctuations.

Although a preferred embodiment of the invention has been illustrated and described herein it will be understood that the invention is susceptible of various modifications and adaptations within the scope of the appended claims.

Having thus described my invention, I claim:

1. In apparatus of the character described, a movable driving member having a cam surface thereon, a movable element adapted to be driven by said member, shiftable means carried by said element, and actuating means for engaging said shiftable means with said cam surface to effect a driving connection between said member and element and comprising movable cooperating mechanical parts operatively associated with said shiftable means to actuate the latter, operating means for said parts normally operatively disengaged with respect thereto, conditioning means operatively connected with said parts to condition the said parts and said operating means in operatively engaged relationship, and means moving in timed relation to said movable member for imparting operating movement to said operating means to operate said parts to actuate positively said shiftable means into cam surface engagement when said parts and said operating means have been conditioned in operatively engaged relationship by said conditioning means as aforesaid.

2. In apparatus of the character described as defined in claim 1 and wherein said movable cooperating parts include an actuating member engaging said shiftable means, a settable member movable with and relative to said actuating member and normally disengaged with respect to said operating means, while operative connections are provided between said conditioning means and said settable member for moving the latter relative to said actuating member to set the presettable member in operative engagement with said operating means to establish an operative connection between said parts and said operating means.

3. In apparatus of the character described as defined in claim 1 and wherein said operating means is a rocker member while said means which moves in timed relation to said movable member is a cam ring acting on said rocker member at predetermined points in the movement of the movable member to rock the rocker member to operate said parts to actuate positively said shiftable means into cam surface engagement.

4. In apparatus of the character described as defined in claim 1 and wherein said operating means is a rocker member, said means which moves in timed relation with said movable member is a cam ring acting to rock said rocker member at predetermined points in the movement of the movable member, while said movable cooperating parts include an actuating member engaging said shiftable means and a settable member movable with and relative to said actuating member and normally disengaged with respect to said rocker member, operative connections being provided between said conditioning means and said settable member for moving the latter relative to said actuating member to set the settable member in operative engagement with said rocker member to establish an operative connection between said rocker member and said parts whereby when said rocker member is rocked by said cam ring said actuating member and said settable member are simultaneously moved to effect positive actuation of said shiftable means into cam surface engagement.

5. In apparatus of the character described in claim 1 and wherein said conditioning means is power operated.

6. In apparatus of the character described in claim 1 and wherein said conditioning means is electrical means.

7. In apparatus of the character described actuating means for engaging a shiftable means carried by a movable driven element with a cam surface on a movable driving member to operatively connect said driven element and said driving member and comprising movable cooperating mechanical parts operatively associated with said shiftable means to actuate the latter and including an actuating member engaging said shiftable means and a settable member movable with and relative to said actuating member, a sleeve rigidly mounting said actuating member and pivotally mounting said settable member, a rockable rod mounting said sleeve for independent rocking movement thereon, a lever arm fixed to said rod, a link pivotally connected to said lever arm and said settable member so that rocking movement of said rod moves said settable member relative to said sleeve and said actuating member; a rocker member having a portion normally disengaged with respect to said settable member but engageable therewith when said settable member is moved relative to said actuating member, conditioning means operatively connected with said rockable rod and when actuated rocking said rod to move said settable member relative to said actuating member to engage said settable member with said portion of said rocker member, and a cam ring moving in timed relation to the movable driving member for imparting rocking movement to said rocker member to actuate said settable member, said sleeve and said actuating member in unison when said settable member is in engagement with said portion of said rocker member to actuate said shiftable means into engagement with the cam surface on the movable driving member.

8. In apparatus of the character described as defined in claim 7 and wherein said portion of said rocker member comprises a pair of spaced arms interconnected at their free ends by a pin, said settable member being a lever arm pivoted at one end to said sleeve and having its opposite end free and provided with a cutaway portion furnishing a shoulder, said shiftable member extending between said pair of arms and said shoulder being engageable with said pin, while said link is pivotally connected to said settable member intermediate the ends of the latter.

9. In apparatus of the character described as defined in claim 7 and wherein said conditioning means includes an electromotive device and a control circuit therefor.

10. In apparatus of the character described actuating means for engaging a shiftable means carried by a movable driven element with a cam surface on a movable driving member to operatively interconnect said driven element and said driving member and comprising power means operatively associated with said actuating means to actuate the latter, movable means moving in timed relation to said movable driving member and operatively associated with said actuating means, and control means for said power means to effect actuation of said power means, said movable means acting on said actuating means after initiation of the actuation of said power means to positively actuate said actuating means independently of the power means to engage said shiftable means with said cam surface of the driving member.

11. In apparatus of the character described actuating means for engaging a shiftable means carried by a movable driven element with a cam surface on a movable driving member to operatively interconnect said driven element and said driving member and comprising movable cooperating mechanical parts operatively associated with the shiftable means to positively and mechanically actuate the latter, power means operatively associated with said parts for moving the same, and means moving in timed relation to the movable driving member and operatively associated with said parts to operate the same mechanically after operation thereof by said power means has been initiated and independently of said power means.

12. In apparatus of the character described as defined in claim 11 and wherein said power means includes an electromotive device and a control circuit therefor.

References Cited in the file of this patent

UNITED STATES PATENTS

| | | |
|---|---|---|
| 1,231,483 | Broadmeyer | June 26, 1917 |
| 1,234,742 | Eggart | July 15, 1917 |
| 1,832,665 | Spaine | Nov. 17, 1931 |
| 2,542,399 | Curtis | Feb. 20, 1951 |